United States Patent [19]

Yamasaki et al.

[11] Patent Number: 5,128,426
[45] Date of Patent: Jul. 7, 1992

[54] METHOD FOR PRODUCING A HIGH SOFTENING POINT ALIPHATIC PETROLEUM RESIN

[75] Inventors: Osamu Yamasaki; Koji Tanaka, both of Yokkaichi, Japan

[73] Assignee: Tosoh Corporation, Shinnanyo, Japan

[21] Appl. No.: 627,146

[22] Filed: Dec. 13, 1990

[30] Foreign Application Priority Data

Dec. 18, 1989 [JP] Japan .................. 1-326177

[51] Int. Cl.$^5$ .............................. C08F 4/14
[52] U.S. Cl. .................. 526/237; 526/76; 526/290
[58] Field of Search ............ 526/237, 290, 76

[56] References Cited

U.S. PATENT DOCUMENTS

| | | | |
|---|---|---|---|
| 2,394,266 | 2/1946 | Soday | 526/290 X |
| 2,764,577 | 9/1956 | Hubbard et al. | 526/290 X |
| 4,381,381 | 4/1983 | Ferraris et al. | 526/290 X |
| 4,824,921 | 4/1989 | Luvinh | 526/290 X |

FOREIGN PATENT DOCUMENTS 0836014  6/1981  U.S.S.R. .................. 526/290

*Primary Examiner*—Fred Teskin
*Attorney, Agent, or Firm*—Oblon, Spivak, McClelland, Maier & Neustadt

[57] ABSTRACT

A method for producing a high softening point aliphatic petroleum resin, which comprises using as a feed oil a C5 fraction which is a mixture of saturated and unsaturated hydrocarbon components having boiling points within a range of from 20°0 to 110° C. formed by cracking or modification of naphtha or petroleum and conducting polymerization of the feed oil by means of a Friedel-Crafts catalyst, wherein isoprene is added to the feed oil in an amount of from 1 to 20% by weight, and the polymerization is conducted by introducing the feed oil into the catalyst dissolved or suspended in an organic solvent, over a period of at least ½ of the polymerization time.

10 Claims, No Drawings

METHOD FOR PRODUCING A HIGH SOFTENING POINT ALIPHATIC PETROLEUM RESIN

BACKGROUND OF THE INVENTION

1. FIELD OF THE INVENTION

The present invention relates to a method for producing a high softening point aliphatic petroleum resin. More particularly, it relates to a method for producing an aliphatic petroleum resin which has a high softening point and yet is free from formation of gel and which is industrially useful, by adjusting the composition of the feed oil and by introducing the feed oil to a catalyst.

2. DISCUSSION OF BACKGROUND

The C5 fraction obtained from cracked naphtha or gas oil contains chain conjugated diolefins such as isoprene, 1,3-pentadiene and 1,3-butadiene, or such diolefins plus $C_4$–$C_{10}$ monoolefinic unsaturated hydrocarbons such as butenes, pentenes and hexenes. However, such C5 fraction also contains cyclopentadiene and dicyclopentadiene which promote formation of a gel and which deteriorates the color of the resin. Such monomer components adversely affecting the resin properties are removed by dimerization and distillation. Then, polymers having various properties are obtained using this fraction as feed material.

There is a polymerization method in which an anhydrous aluminum chloride liquefied catalyst using an oxygen-containing compound or the like as a complexing agent, is used as the polymerization catalyst, and a method in which a solid anhydrous aluminum chloride is used by itself as a catalyst. They are practically employed. The reaction methods using such catalysts are conducted in accordance with a known method such as a batch method or a continuous method, or a method in which the catalyst is introduced into the feed material or a method wherein the feed oil fraction is introduced to the catalyst.

SUMMARY OF THE INVENTION

It is an object of the present invention to solve a problem that when the softening point of a resin polymerized and produced by a conventional method is raised merely by increasing the degree of polymerization, its solubility in the solvent deteriorates due to an increase of the molecular weight, and a problem that the softening point can not be raised if the molecular weight is maintained.

It is another object of the present invention to provide a method for producing an aliphatic petroleum resin having substantially the same molecular weight or molecular weight distribution as the resin produced by conventional methods and having a softening point at a high temperature level.

Thus, the present invention provides a method for producing a high softening point aliphatic petroleum resin, which comprises using as a feed oil a C5 fraction which is a mixture of saturated and unsaturated hydrocarbon components having boiling points within a range of from 20° to 110° C. formed by cracking or modification of naphtha or petroleum and conducting polymerzation of the feed oil by means of a Friedel-Crafts catalyst, wherein isoprene (2-methyl-1,3-butadiene) is added to the feed oil in an amount of from 1 to 20% by weight, and the polymerization is conducted by introducing the feed oil into the catalyst dissolved or suspended in an organic solvent, over a period of at least ½ of the polymerization time.

Now, the present invention will be described in detail with reference to the preferred embodiments.

The feed oil to be used in the present invention is a C5 fraction containing $C_4$–$C_6$ chain conjugated diolefins represented by isoprene and piperilene and monoolefinic unsaturated hydrocarbons such as butenes, pentenes, methylbutenes, diisobutylene and cyclopentenes. For examples, a composition (wt%) of this feed oil may be as follows:
3-methyl-1-butene 0.3–2.5%
isopentane 9.0–28.0%
1,4-pentadiene 0.2–3.3%
1-pentene 2.3–6.8%
2-methyl-1-butene 2.5–6.9%
n-pentane 16.4–38.0%
isoprene 9.6–19.5%
trans-2-pentene 4.2–7.6%
cis-2-pentene 4.0–6.7%
2-methyl-2-butene 1.2–4.9%
trans-1,3-pentadiene 4.7–12.8%
cis-1,3-pentadiene 3.5–5.9%
cyclopentene 3.1–5.4%
cyclopentane 0.6–4.5%
2-3-dimehtyl-1-butene 0.2–3.1%
2-methylpentane 3.3–4.7%
4-methyl-2-pentene 0.5–4.6%
3-methylpentane 0.7 4.3%
n-hexane 0.4–2.5%

To the extent not to substantially impair the effects of the present invention, cyclopentadiene, a dimer thereof or a codimer of cyclopentadiene and a chain conjugated diene may be contained. By the addition of isoprene to this feed oil, the composition (wt%) becomes as follows:
3-methyl-1-butene 0.1–2.5%
isopentane 8.1–27.5%
1,4-pentadiene 0.2–3.1%
1-pentene 2.0–5.9%
2-methyl-1-butene 2.1–6.2%
n-pentane 15.2–36.6%
isoprene 9.7–30.0%
trans-2-pentene 3.8–6.5%
cis-2-pentene 3.5–6.5%
2-methyl-2-butene 0.9–4.8%
trans- 1,3-pentadiene 4.0–12.5%
cis-1,3-pentadiene 2.0–5.8%
cyclopentene 2.4–5.2%
cyclopentane 0.2–4.4%
2,3-dimethyl-1-butene 0.1–3.0%
2-methylpentane 2.8–4.6%
4-methyl-2-pentene 0.2–4.5%
3-methylpentane 0.3–4.3%
n-hexane 0.2–2.4%

As the Friedel-Crafts catalyst to be used as the polymerization catalyst, an aluminum halide, particularly aluminum chloride, may be employed. Such catalyst is dissolved or suspended in an organic solvent like an aromatic compound such as benzene, xylene or benzene chloride. Such a solution or suspension is preliminarily introduced in a reactor, and the above mentioned feed oil having isoprene added in an amount of from 1 to 20 parts by weight, is gradually introduced into the reactor for polymerization. The present invention is carried out in this manner.

Accordingly, the present invention is applicable only to a method for producing a petroleum resin by a batch system. If other method such as a polymerization method wherein the catalyst is introduced into the feed material, or a method wherein the polymerization reaction is conducted continuously, is employed and if the feed oil of the present invention having a high isoprene content is used, a gel is likely to form although the softening point of the resulting resin may be raised, and it is likely to give an adverse effect to the physical properties such as the solubility of the resulting resin. Therefore, such a method can not be used.

The aluminum halide is used usually in the form of particles having a size of from 5 to 200 mesh. However, the particle size is not limited to such a range and may be larger or smaller than this range.

The catalyst is used usually in an amount of from 0.5 to 3.0 parts by weight, preferably from 0.8 to 2.0 parts by weight, relative to the feed oil. If the amount is less than this range, the yield of the resin tends to be too low for practical operation. On the other hand, if the amount is larger than the above range, the color, the heat resistance, etc. of the resulting resin tend to be poor, such being undesirable.

The polymerization is conducted usually at a polymerization temperature of from 20° to 100° C., preferably from 40° to 80° C.

The pressure of the reaction system may be at atmospheric pressure or higher or lower than atmospheric pressure. On the other hand, the reaction time is also not critical and may usually be changed from a few minutes to 12 hours or more.

However, the time for the introduction of the feed oil to the catalyst suspension is required to be at least ½ of the above mentioned reaction time. If the introduction is conducted in a period shorter than this, it becomes difficult to control the temperature of the polymerization system, since the reaction is usually an exothermic reaction, whereby the color of the resulting resin deteriorates and in some cases, gelation takes place.

The polymer obtained by the above operation is treated by a usual method and further dried.

Now, the present invention will be described in further detail with reference to Examples. However, it should be understood that the present invention is by no means restricted to such specific Examples. In the Examples and Reference Examples "parts" and "%" are by weight unless otherwise specified.

EXAMPLE 1

Into a stainless steel autoclave, 100 parts of benzene and 1.5 parts of aluminum chloride as a catalyst were charged, and the temperature of the system was maintained at 80° C. under stirring. Then, to the above suspension, a feed oil containing 25% by weight of isoprene obtained by mixing 50 parts of isoprene and 450 parts by C5 fraction obtained from a fraction of the cracking of naphtha containing isopentane, 1-pentene, 2-methyl-1-butene, n-pentane, isoprene, 2-pentene, piperilene, cyclopentene, was gradually continuously added over a period of 90 minutes.

The system underwent a temperature raise due to heat generation by the reaction, and therefore the system was cooled from the exterior to maintain the temperature in the system to a level of 80° C.

After completion of the addition of the feed material, stirring was continued for further 90 minutes to promote the reaction, and then 250 parts of a 3.0% sodium hydroxide aqueous solution was added to decompose aluminum chloride and complete the polymerization.

Stirring was stopped, and the mixed solution thus obtained was left to stand for further one hour under the same temperature, whereby the upper oil phase having the polymer dissolved therein and a lower aqueous phase containing aluminum hydroxide obtained from the deactivated catalyst, were separated.

The upper oil phase was transferred to a glass separable flask and heated while blowing nitrogen into the flask to remove an unreacted hydrocarbon and solvent.

With respect to the hydrocarbon resin, the physical properties such as the resin yield, the softening point (measured by a circular ball method stipulated by JIS K-2207), the weight average molecular weight and the number average molecular weight (measured by GPC, HLC-8020, manufactured by TOSOH CORPORATION) and the Gardner color scale (measured in accordance with ASTM D-1544-63T), were measured.

COMPARATIVE EXAMPLE 1

Polymerization was conducted in the same manner as the polymerization in Example 1 except that no isoprene was added to the feed oil, and the C5 fraction obtained from the cracking of naphtha was subjected by itself to polymerization. The obtained resin was a resin having narrow molecular weight distribution and excellent solubility in various solvents, but the softening point was as low as not higher than 80° C.

COMPARATIVE EXAMPLE 2

The C5 fraction having isoprene added to the polymerization feed oil used in Example 1, was preliminarily charged into an autoclave, and then an aluminum chloride liquid catalyst liquefied by means of a complexing agent (phenol), was gradually introduced into the autoclave to conduct polymerization. Although the softening point of the resulting resin was high, the average molecular weight was large, and the molecular weight distribution was wide. Accordingly, the obtained resin had poor solubility in a carbon tetrachloride solvent.

COMPARATIVE EXAMPLE 3

An aluminum chloride catalyst liquefied by means of a complexing agent (methyl ethyl ketone) was preliminarily charged into an autoclave, and then polymerization was conducted using the C5 fraction obtained by cracking of naphtha without addition of isoprene as shown in Comparative Example 2, as the feed oil. As a result, the softening point of the obtained resin was low at a level of a not higher than 80° C.

The above results will be shown in Tables 1 and 2.

TABLE 1

|  | Polymer yield (%) | Softening point (°C.) | Number average molecular weight (Mn) | Weight average molecular weight (Mw) | Molecular weight distribution (Mn/Mw) | Color (GI) |
| --- | --- | --- | --- | --- | --- | --- |
| Example 1 | 44.9 | 108.0 | 900 | 2440 | 2.7 | 6.0 |
| Comparative Example 1 | 36.0 | 79.8 | 1000 | 1460 | 1.5 | 10.0 |
| Comparative Example 2 | 36.0 | 96.8 | 860 | 19270 | 22.4 | 11.2 |

TABLE 1-continued

| | Polymer yield (%) | Softening point (°C.) | Number average molecular weight (Mn) | Weight average molecular weight (Mw) | Molecular weight distribution (Mn/Mw) | Color (GI) |
| --- | --- | --- | --- | --- | --- | --- |
| Comparative Example 3 | 32.8 | 77.5 | 840 | 2760 | 3.3 | 6.4 |

TABLE 2

| | Hexane | Benzene | Toluene | Chloroform | Carbon tetrachloride |
| --- | --- | --- | --- | --- | --- |
| Example 1 | ○ | ○ | ○ | ○ | ○ |
| Comparative Example 1 | ○ | ○ | ○ | ○ | ○ |
| Comparative Example 2 | Δ | Δ | ○ | X | X |
| Comparative Example 3 | ○ | ○ | ○ | ○ | Δ |

○: Soluble, Δ: Partially insoluble, X: Only partially soluble

As is apparent from the forgoing description, according to the present invention, it is possible to produce an aliphatic petroleum resin having a high softening point i.e. an aliphatic petroleum resin having a softening point of at least 100° C., which is free from formation of gel, by conducting polymerization by a batch system polymerization method of the present invention using a C5 fraction feed oil which is apt to form a gel by an addition of isoprene.

The hydrocarbon resin obtained by the present invention has an improved yield since the content of the monomer component in the feed material increases by the addition of isoprene and has an excellent resin color i.e. a Gardner color scale of at most 6 in a 50% toluene solution as measured by ASTM D-1544-68T and a softening point of from 80° to 130° C., preferably from 100° to 120° C., as stipulated by JIS K-2207, and it is soluble in an aliphatic, aromatic or halogenated hydrocarbon solvent such as pentane, hexane, benzene, toluene, chloroform or carbon tetrachloride and is a resin polymer showing a low melt viscosity.

In the case of aliphatic petroleum resins, those having a softening point within a temperature range of from 90° to 100° C. are commonly employed. Whereas, the high softening point aliphatic petroleum resin of the present invention having the molecular weight and the molecular weight distribution substantially equal to the common aliphatic petroleum resins having a softening point of 100° C., is useful in the field of hot melt adhesives for applications which are expected to expand in future.

What is claimed is:

1. A method for producing a high softening point aliphatic petroleum resin, which comprises using as a feed oil a C5 fraction which is a mixture of saturated and unsaturated hydrocarbon components having boiling points within a range of from 20° to 110° C. formed by cracking or modification of naphtha or petroleum and conducting polymerization of the feed oil by means of a Friedel-Crafts catalyst, wherein isoprene is added to the feed oil in an amount of from 1 to 20% by weight, the improvement wherein batchwise polymerization is conducted by introducing the feed oil into the catalyst dissolved or suspended in an organic solvent, over a period of at least ½ of the polymerization time.

2. The method according to Claim 1, wherein the C5 fraction comprises $C_4$-$C_6$ chain conjugated diolefins and monoolefinic unsaturated hydrocarbons.

3. The method according to Claim 1, wherein the Friedel-Crafts catalyst is an aluminum halide.

4. The method according to Claim 3, wherein the aluminum halide is aluminum chloride.

5. The method according to Claim 1, wherein the organic solvent is an aromatic compound.

6. The method according to Claim 5, wherein the aromatic compound is benzene, xylene or benzene chloride.

7. The method according to Claim 1, wherein the catalyst is used in an amount of from 0.5 to 3.0 parts by weight relative to the feed oil.

8. The method according to Claim 1, wherein the catalyst is used in an amount of from 0.8 to 2.0 parts by weight relative to the feed oil.

9. The method according to Claim 1, wherein the polymerization is conducted at a temperature of from 20° to 100° C.

10. The method according to Claim 1, wherein the polymerization is conducted at a temperature of from 40° to 80° C.

* * * * *